(12) United States Patent
Hwang et al.

(10) Patent No.: US 6,661,454 B1
(45) Date of Patent: Dec. 9, 2003

(54) DIGITAL CAMERA WITH MEMORY CARD FULLNESS ICON

(75) Inventors: Hyejung Hwang, Rochester, NY (US); Michael Venturino, Geneseo, NY (US); George E. Lathrop, Dansville, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/332,620

(22) Filed: Jun. 14, 1999

(51) Int. Cl.[7] .................................................. H04N 5/76
(52) U.S. Cl. ........................ 348/231.1; 348/231.8; 348/231.9
(58) Field of Search ...................... 348/231.99, 231.1, 348/231.7, 231.8, 231.9

(56) References Cited

U.S. PATENT DOCUMENTS

| | | | |
|---|---|---|---|
| 3,971,065 A | 7/1976 | Bayer | |
| 4,746,993 A | 5/1988 | Tada | |
| 5,016,114 A | * 5/1991 | Sakata et al. | ................ 358/404 |
| 5,034,804 A | 7/1991 | Sasaki et al. | |
| 5,153,729 A | 10/1992 | Saito | |
| 5,159,458 A | 10/1992 | Murata et al. | |
| 5,164,831 A | 11/1992 | Kuchta et al. | |
| 5,298,936 A | 3/1994 | Akitake et al. | |
| 5,418,926 A | 5/1995 | Horii et al. | |
| 5,432,570 A | 7/1995 | Ueda et al. | |
| 5,481,303 A | 1/1996 | Uehara | |
| 5,517,277 A | 5/1996 | Goto et al. | |
| 5,541,656 A | 7/1996 | Kare et al. | |
| 5,550,970 A | 8/1996 | Cline et al. | |
| 5,627,587 A | 5/1997 | Murata et al. | |
| 5,648,816 A | 7/1997 | Wakui | |
| 5,649,245 A | 7/1997 | Inoue et al. | |
| 5,684,506 A | 11/1997 | Taylor et al. | |
| 5,697,004 A | 12/1997 | Saegusa et al. | ................ 348/231 |
| 5,905,528 A | * 5/1999 | Kodama | ...................... 348/231 |
| 5,986,700 A | * 11/1999 | Wakui | ........................ 348/231 |
| 2001/0015760 A1 | * 8/2001 | Fellegara et al. | ........... 348/231 |

OTHER PUBLICATIONS

Chinon Memory Card Holder Specification ES–1000.
PC Magazine—Digital Cameras: Agfa ePhoto 307.
Cyberian Outpost/Product Detail—Canon cameras PowerShot Pro70.
Kodak: How to Use D210 LCD Camera.
PC Magazine—Digital Cameras: Kodak DC20, DC40 and DC50.
Personal Computer Memory Card International Association, PC Card Standard Release 2.0, Sep. 1991.

* cited by examiner

Primary Examiner—Wendy R. Garber
Assistant Examiner—Catherine Toppin
(74) Attorney, Agent, or Firm—Pamela R. Crocker

(57) ABSTRACT

A digital camera having a plurality of adjustable memory card fullness icons to visually indicate the amount of memory space that is available for storage in a plurality of corresponding removable memory cards insertable into the digital camera is disclosed. The digital camera includes an arrangement for capturing and digitizing image data, a display, and a processor for constructing the memory card fullness icon on the display. Each memory card fullness icon includes an inner portion that can be adjusted to graphically display the relative amount of memory space that is available for storage in its corresponding removable memory card. The digital camera further includes circuitry for transferring the digitized image data into a selected removable memory card. The processor determines the relative amount of available memory space in the selected memory card and modifies the adjustable inner portion of the memory card fullness icon on the display to visually indicate in graphic format the present relative amount of available memory space in the selected memory card.

15 Claims, 5 Drawing Sheets

DIGITAL CAMERA WITH MEMORY CARD FULLNESS ICON

FIELD OF THE INVENTION

The present invention relates generally to the field of electronic imaging, and in particular, to digital cameras having memory cards.

BACKGROUND OF THE INVENTION

Typical digital cameras include a memory card onto which captured digital images can be stored. Many digital cameras provide an indication of the approximate number of images that could be stored on a memory card. However, this number depends on the resolution level and compression mode, which can be confusing to a user. This can be difficult for the user to determine whether the memory card is nearly empty or nearly full.

Some new digital cameras provide two memory card slots, which enable images to be stored on either card, or transferred from one card to another. This increases a user's difficulty in determining the amount of memory space that is available for storage in each of the memory cards.

U.S. Pat. No. 5,481,303 discloses an electronic still camera which uses a memory card for storing captured images. The camera includes an indicator light and detects the remaining capacity on the memory card, and causes the indicator light to flash when the available memory space on the memory card is close to capacity.

SUMMARY OF THE INVENTION

Accordingly, it is an object of the present invention to provide a visual indication which can quickly determine how much space has been used on each memory card, and how much available memory space is remaining.

It is a further object of the present invention to provide a digital camera having an adjustable memory card fullness icon which visually indicates in graphic format the relative amount of available memory space on a removable memory card.

These objects are achieved by a digital camera having an adjustable memory card fullness icon to visually indicate in graphic format the amount of memory space that is available for storage in a removable memory card insertable into the digital camera, comprising:

(a) means for capturing and digitizing image data;
(b) a display;
(c) a processor coupled to the display for constructing the memory card fullness icon on the display, the memory card fullness icon having a graphical representation of a memory card, and including an inner portion that can be adjusted to graphically display the relative amount of memory space that is available for storage in the removable memory card;
(d) means for receiving the removable memory card;
(e) means for transferring the digitized image data into the removable memory card; and
(f) the processor including means responsive to the data transfer means for determining the relative amount of available memory space in the removable memory card and for modifying the adjustable inner portion of the memory card fullness icon on the display in accordance with the determined relative amount of available memory space to visually indicate in graphic format the present relative amount of available memory space in the removable memory card.

These objects are also achieved by a digital camera having a plurality of memory card fullness icons to visually indicate the amount of memory space that is available for storage in a plurality of corresponding removable memory cards insertable into the digital camera, comprising:

(a) means for capturing and digitizing image data;
(b) a display;
(c) a processor coupled to the display for constructing the plurality of memory card fullness icons on the display, each memory card fullness icon having an inner portion that can be adjusted to display in graphic format the relative amount of memory space that is available for storage in its corresponding removable memory card;
(d) means for receiving the plurality of removable memory cards;
(e) means for selecting one of the plurality of removable memory cards for storage;
(f) means for transferring the digitized image data into the selected removable memory card; and
(g) the processor including means responsive to the data transfer means for determining the relative amount of available memory space in the selected removable memory card and for modifying the adjustable inner portion of the corresponding memory card fullness icon on the display in accordance with the determined relative amount of available memory space on the selected removable memory card to visually indicate in graphic format the present relative amount of available memory space in the selected removable memory card.

ADVANTAGES

It is an advantage of the present invention to provide a digital camera having a simple, easily understood visual indication of the approximate amount of memory remaining on a removable memory card. In this manner, a user would know whether an additional memory card is needed, or whether captured images should be downloaded to a computer for storage.

An important feature of the present invention is that a digital camera can have two memory cards and a user can select the appropriate memory card for image storage. A user can determine how much memory space is available on each card by viewing the graphical display on the icon. This is particularly useful for applications such as sports photography, where the photographer would like to know whether a memory card is nearly empty or nearly full before a major event is about to occur. A user can also transfer images from one card to another within the digital camera. This is particularly useful for image management in situations, for example, where a user is taking pictures for multiple clients.

DETAILED DESCRIPTION OF THE INVENTION

Because imaging devices employing electronic sensors are well known, the present description will be directed in particular to elements forming part of, or cooperating more directly with, apparatus in accordance with the present invention. Elements not specifically shown or described herein may be selected from those known in the art.

Figure 1:
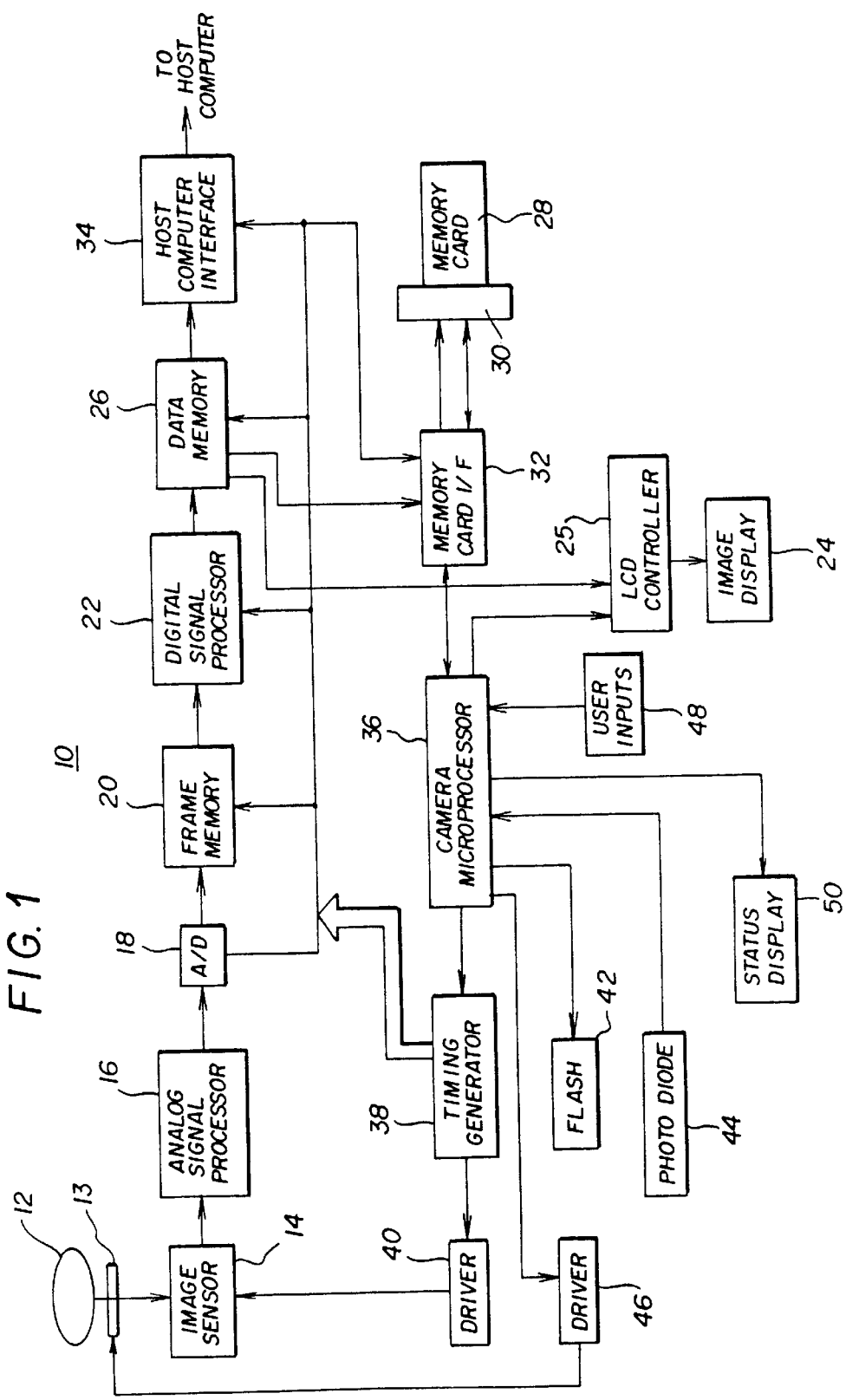
FIG. 1 is block diagram of a digital camera including a single memory card in accordance with a first embodiment of the present invention.

Referring to FIG. 1, a block diagram of an exemplary digital camera 10 in accordance with a first embodiment of the present invention is shown, such as, for example, the Kodak DCS 315™ digital camera sold by the Eastman Kodak Company. As shown in FIG. 1, the digital camera 10 includes a lens 12 which directs image light from a subject (not shown) through an aperture/shutter controller 13 upon an image sensor 14 having a discrete number of photosites or pixels arranged in a two-dimensional array to form individual photosites corresponding to the pixels of the image. The image sensor 14 can be a charge coupled device (CCD) sensor, such as, for example, the Kodak KAF-1600 full-frame sensor having 1536 columns and 1024 rows of photosites, or a complementary metal oxide semiconductor (CMOS) imager. The photosites of the image sensor 14 convert the incident photons of light into electron charge packets. Each photosite is overlaid with a color filter array (CFA), such as the Bayer CFA described in commonly-assigned U.S. Pat. No. 3,971,065, the disclosure of which is herein incorporated by reference. The Bayer CFA has 50% green pixels in a checkerboard mosaic, with the remaining pixels alternating between red and blue rows. The photosites respond to the appropriately colored incident light illumination to provide an analog signal corresponding to the intensity of illumination incident on the photosites.

The analog output of each pixel is amplified and analog processed by an analog signal processor (ASP) 16 to reduce the image sensor's output amplifier noise. The output of the ASP 16 is converted to a digital image signal by an analog-to-digital (A/D) converter 18, such as, for example, an 8 bit A/D converter which provides an 8 bit signal in the sequence of the Bayer CFA.

The digitized image signal is temporarily stored in a frame memory 20, and is then processed and compressed by a digital signal processor (DSP) 22. The image processing includes white balance, color correction, tone correction, and image sharpening. The DSP 22 also decimates (or resamples) the digitized image signal for each still image to produce a thumbnail image having fewer pixels (i.e., lower resolution) than the original captured image as described in commonly-assigned U.S. Pat. No. 5,164,831 to Kuchta et al., the disclosure of which is herein incorporated by reference. The image file containing both the full resolution image and the thumbnail image is stored in a data memory 26, and then transferred through a memory card interface 32 to a memory card 28 that is present in a memory card slot 30 of the digital camera 10. The thumbnail image is also sent to an image display 24, such as a Seiko Epson Model LB18-B000 312×230 pixel color liquid crystal display (LCD), through an LCD controller 25 where the user can view the image. The image display 24, which is shown in more detail in FIGS. 2A–2C and which will be discussed later, includes a conventional arrangement for displaying the captured image. The image display 24 may, alternatively, utilize many other types of raster image displays, including miniature CRT's, organic light emitting diode (LED) arrays, or field emission displays.

The memory card 28 can be adapted to the PCMCIA card interface standard, such as described in the *PC Card Standard, Release* 2.0, published by the Personal Computer Memory Card International Association, Sunnyvale, Calif., September 1991. The memory card 28 can also be adapted to the Compact Flash interface standard, such as described in the *CompactFlash Specification Version* 1.3, published by the CompactFlash Association, Palo Alto, Calif., Aug. 5, 1998.

Electrical connection between the memory card 28 and the digital camera 10 is maintained through a card connector (not shown) positioned in the memory card slot 30. The memory card interface 32 and the card connector provide, e.g., an interface according to the aforementioned PCMCIA card or CompactFlash interface standard. The image file may also be sent to a host computer (not shown), which is connected to the digital camera 10 through a host computer interface 34.

In operation, a camera microprocessor 36 receives user inputs 48, such as from a shutter release (not shown), and initiates a capture sequence by signaling a timing generator 38. The timing generator 38 is connected generally to the elements of the digital camera 10, as shown in FIG. 1, for controlling the digital conversion, compression, and storage of the image signal. The camera microprocessor 36 also processes a signal from a photodiode 44 for determining a proper exposure, and accordingly signals an exposure driver 46 for setting the aperture and shutter speed via the aperture/shutter controller 13 and triggers a flash unit 42 (if needed). The image sensor 14 is then driven from the timing generator 38 via a sensor driver 40 to produce the image signal. The user inputs 48 are used to control the operation of the digital camera 10 in a well-known manner.

Figure 2A:
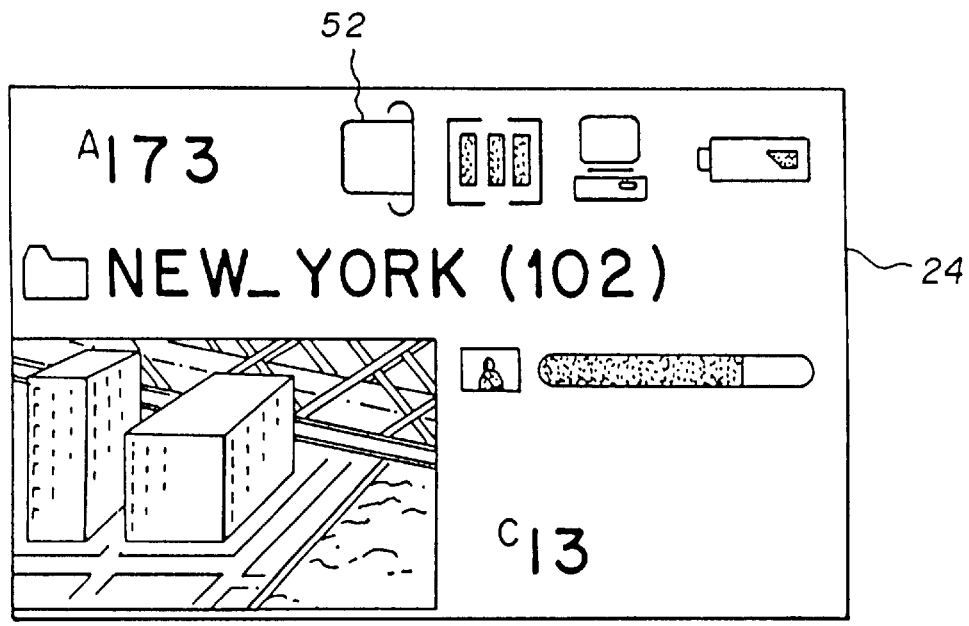
FIG. 2A depicts an image display on the digital camera of FIG. 1 which has a memory card fullness icon that graphically displays that the memory card does not contain any image data.
Figure 2B:
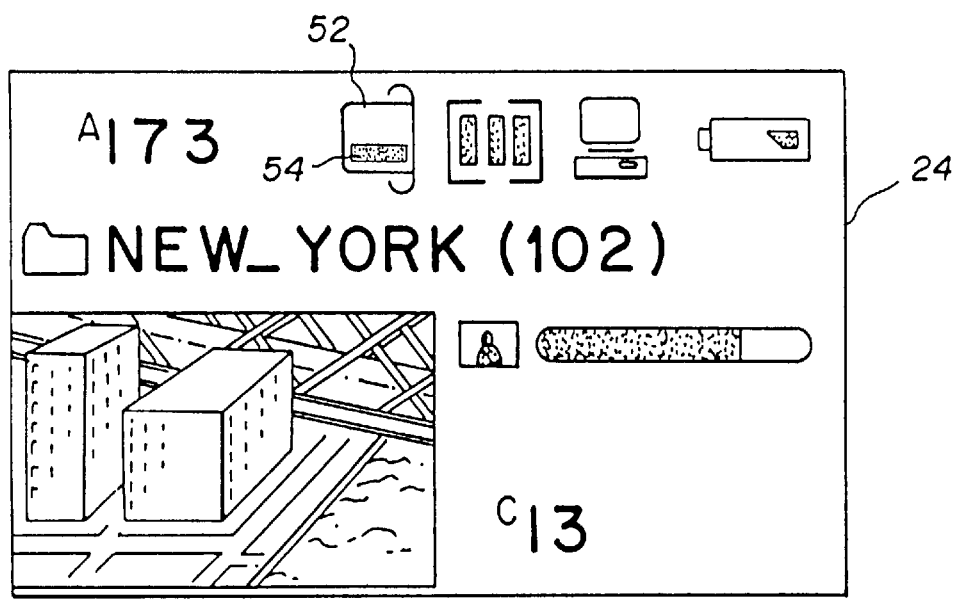
FIG. 2B depicts the same image display as FIG. 2A, but shows the memory card fullness icon as indicating that the memory card is one third full.
Figure 2C:
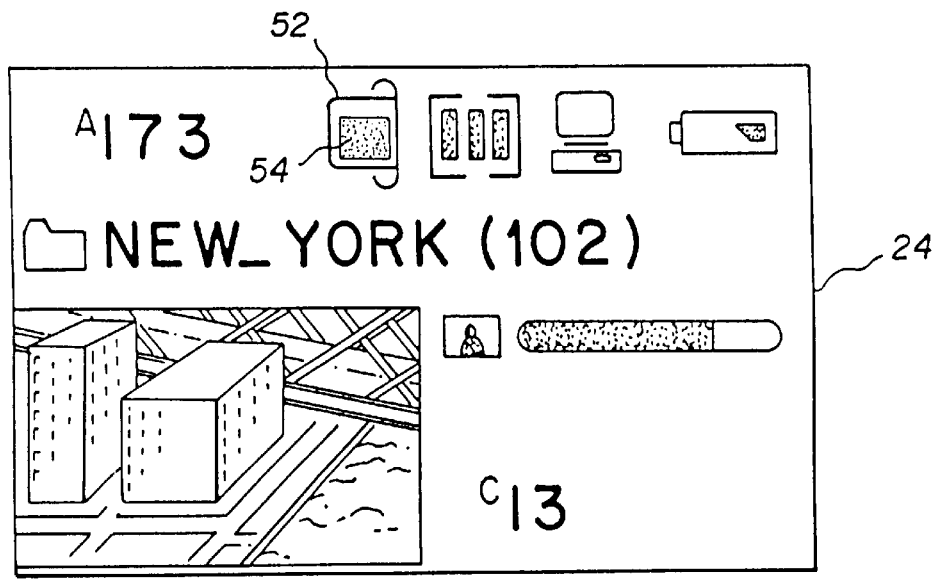
FIG. 2C depicts the same image display as FIG. 2B, except that the memory card fullness icon indicates that the memory card is two thirds full.

Referring now to FIGS. 2A–2C, a memory card fullness icon 52 is provided on the image display 24 in accordance with the present invention. The memory card fullness icon 52 includes a graphical representation of the removable memory card 28. The memory card fullness icon 52 further includes an inner portion 54 that can be adjusted to graphically display the relative amount of memory space that is available for storage in the removable memory card 28. The use of the term "graphic" means a non-numeric indication which has an adjustable portion such as a bar or a colored area. For example, the graphical format on the memory card fullness icon 52 (or 66 and 68) can be provided by adjustable color portions. One color can indicate the amount of memory availability, while another color can indicate the amount of used memory. In FIG. 2A, the memory card fullness icon 52 indicates that the memory card 28 is empty. In FIG. 2B, the memory card fullness icon 52 indicates that the memory card 28 is one third full. In FIG. 2C, the memory card fullness icon 52 indicates that the memory card 28 is two thirds full.

The camera microprocessor 36, which is coupled to the image display 24 through the LCD controller 25 (see FIG. 1), constructs the memory card fullness icon 52 on the image display 24. The camera microprocessor 36 determines, using the memory card interface 32, the amount of total memory and available memory in the memory card 28. The ratio of the available memory to the total memory in the memory card 28 is then calculated by the camera microprocessor 36. The camera microprocessor 36 then provides appropriate signals to the memory card fullness icon 52 on the image display 24 to cause the modification of the adjustable inner portion 54 of the memory card fullness icon in accordance with the determined ratio of the available memory to the total memory to visually indicate in graphic format the present relative amount of available memory space in the memory card 28. Other circuit architectures will suggest themselves to those skilled in the art. For example, the data memory 26 can be directly coupled by a bus to the image display 24 under the control of the camera microprocessor 36.

The portion of the memory card fullness icon 52 that is filled is determined by the following ratio:
[number of bytes that are currently "used" or recorded on memory card 28]/[number of total bytes available for storage on the memory card 28]. For example, if the digital camera 10 uses an 8 Mbyte memory card and 2 Mbyte worth of images has been taken, 6 Mbyte are available for storage on the memory card 28 and the memory card fullness icon 52 is 25 percent full. The memory card fullness icon 52 does not assume a specific resolution level or compression; it is independent of both of these settings. Accordingly, it is easier for a user to understand whether the memory card 28 is "mostly" full or "mostly" empty, compared to having only a number of pictures remaining that changes as a function of resolution level and compression mode.

Figure 3A:
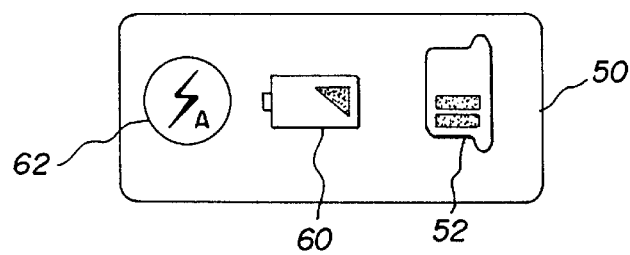
FIG. 3A depicts another embodiment of the present invention wherein the memory card fullness icon is shown on a status display on the digital camera of FIG. 1.
Figure 3B:
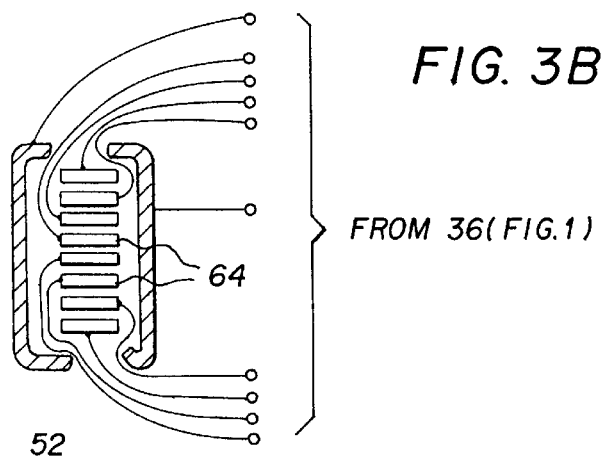
FIG. 3B depicts the memory card fullness icon as being a status liquid crystal display.

Referring again to FIG. 1, a status display 50 is shown which can be used in place of the image display 24 for displaying the memory card fullness icon 52. FIG. 3A shows the status display 50 in more detail. As shown in FIG. 3A, the status display 50 also displays a conventional battery level indicator 60 and a flash mode indicator 62. In FIG. 3B, the memory card fullness icon 52 is shown in more detail. As shown, the memory card fullness icon 52 is provided by a series of liquid crystal display (LCD) segments 64 which are controlled to visually indicate in a graphic format the available storage on the memory card 28. Each LCD segment 64 provides for a different level of storage fullness on the memory card 28. The LCD segments 64 are driven by the camera microprocessor 36 by way of LCD segment drivers which are understood to be included in the block labeled "camera microprocessor 36" on FIG. 1. The status display 50 could, alternatively, use light emitting diodes (LED's) or other emissive display technologies.

Figure 5:
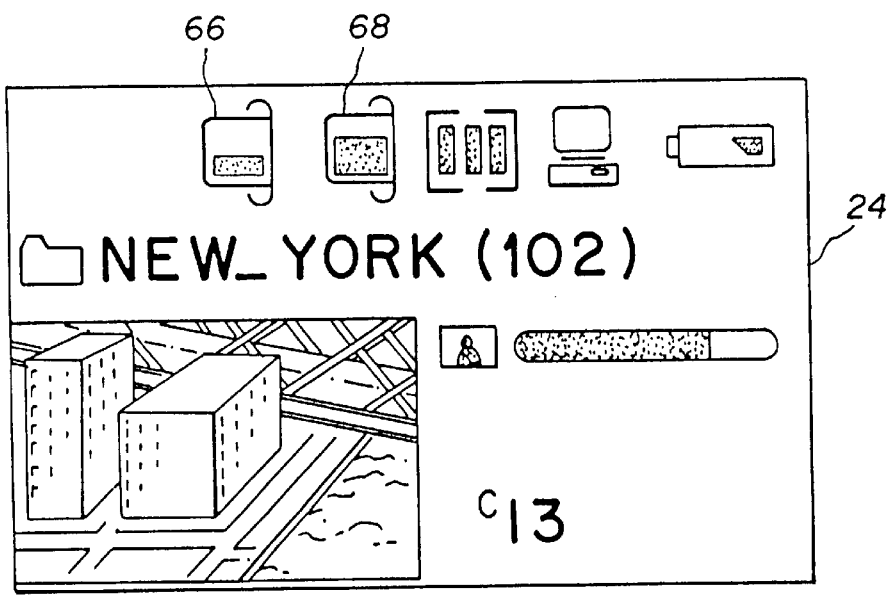
FIG. 5 depicts an image display on the digital camera of FIG. 4 which has two memory card fullness icons that graphically display the availability of memory storage on/he two memory cards, respectively.
Figure 4:
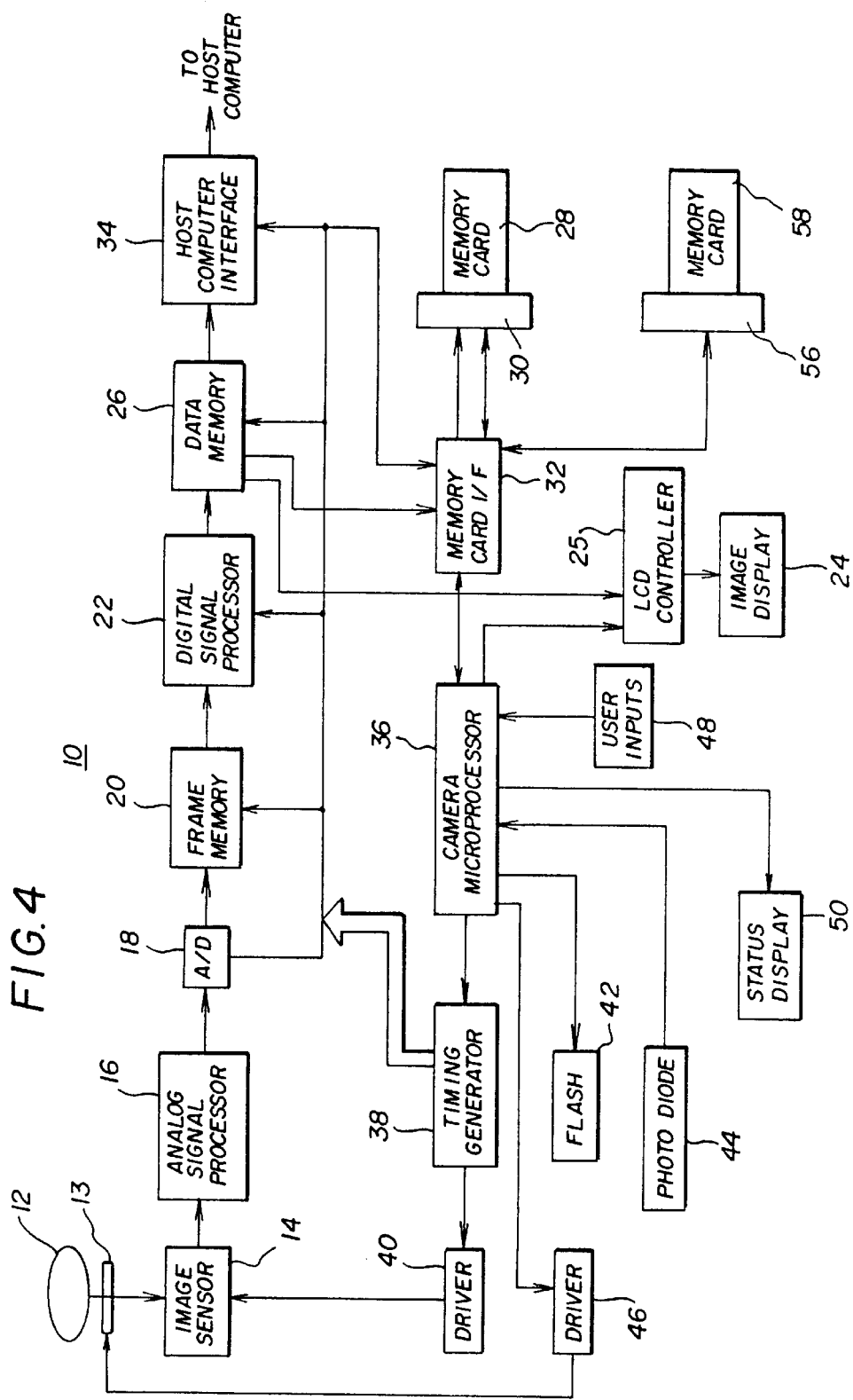
FIG. 4 is block diagram of another embodiment of a digital camera including two memory cards.

Turning now to FIG. 4, a block diagram similar to FIG. 1 is depicted. The main difference is that this block diagram includes a second memory card 58 that is present in a second memory card slot 56 which is electrically connected to the memory card interface 32. The operation of the digital camera 10 is similar to FIG. 1 with the exception that the user, through the user inputs 48, can select which of the memory cards 28 or 58 is to be used for storing captured images. The user can also cause image information to be transferred through the memory card interface 32 from one of the memory cards to another memory card under the control of the camera microprocessor 36. The image display 24 or the status display 50 now has two memory card fullness icons 66 and 68 which respectively correspond to memory cards 28 and 58 and indicate their respective relative availability of memory storage. FIG. 5 shows the image display 24 with the two memory card fullness icons 66 and 68. As shown, the memory card fullness icon 66 indicates that the memory card 28 is one third full and the memory card fullness icon 68 indicates that the memory card 58 is two thirds full.

Figure 6:
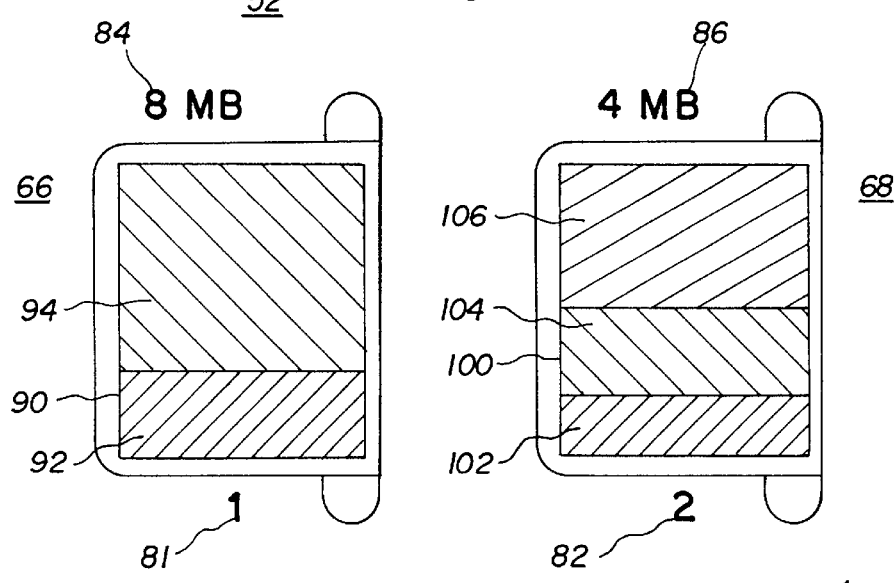
FIG. 6 depicts an alternative embodiment of the two memory card fullness icons on the image display of FIG. 5.

FIG. 6 depicts an alternative embodiment of the two memory card fullness icons 66 and 68 on the image display 24 of FIG. 5. The first memory card fullness icon 66 includes a card slot number 80 (indicating the first memory card 28 inserted in the memory card slot 30 shown in FIG. 4) and a card total memory size value 84 (indicating, for example, that the first memory card 28 is an 8 Mbyte capacity card). Similarly, the second memory card fullness icon 68 includes a card slot number 82 (indicating the second memory card 58 inserted in 5 memory card slot 56) and a card total memory size value 86 (indicating, for example, that the second memory card 58 is a 4 Mbyte capacity card).

In accordance with the present invention, the memory fullness icons 66 and 68, as shown in FIG. 6, include inner portions 90 and 100, respectively, that are adjusted to graphically display the amount of memory space that is available for storage in each corresponding memory card, relative to the largest capacity of the two cards (for example, relative to the 8 Mbyte card capacity of the first memory card 28 inserted in the memory card slot 30). The inner portion 90 of the first memory card fullness icon 66 includes two regions 92 and 94, which differ in tone or color. In a preferred embodiment, the upper region 94 is colored green, indicating the relative amount of available (i.e., unused) memory space on the first memory card 28 while the lower region 92 is colored black, indicating the relative amount of memory on the first memory card 28 which is currently storing images.

Because the total capacity of the second memory card 58 is less than the total capacity of the first memory card 28, the inner portion 100 of the second memory card fullness icon 68 includes three regions 102, 104, and 106 which all differ in tone or color. In a preferred embodiment, the upper region 106 is colored red, indicating that the second memory card 58 has a proportionally lower memory capacity than the first memory card 28. The middle region 104 is colored green, indicating the relative amount of available (i.e., unused) memory space on the second memory card 58, while the lower region 102 is colored black, indicating the relative amount of memory which is currently storing images.

The colored inner portions 90 and 100 of the memory card fullness icons 66 and 68, respectively, enable the user to easily visualize whether or not it will be possible to copy images from one memory card to another. For example, if the height of the green region 104 of the second memory card fullness icon 68 is larger than the height of the black region 92 of the first memory card fullness icon 66, all of the images stored on the first memory card 28 can be copied to the second memory card 58 (i.e., the memory card 58 has sufficient available memory space to receive all of the images stored on the memory card 28).

Alternatively, the memory card fullness icons 66 and 68 for the two different capacity memory cards 28 and 58, respectively, could be displayed using two different sized icons, rather than using three different regions (i.e., regions 102, 104, and 106) for the memory card fullness icon of the smaller capacity card. For example, the memory card fullness icon 68 for the 4 Mbyte memory card could have a smaller vertical height than the memory card fullness icon 66 for the 8 Mbyte card. The memory card fullness icon 68 would then use only two different regions (i.e., regions 102 and 104) rather than the three regions depicted in FIG. 6. This approach would allow use of relative size as a perceptual indicator of used/unused capacity for different capacity memory cards.

The invention has been described in detail with particular reference to preferred embodiments thereof. It will be understood that variations and modifications can be effected within the spirit and scope of the invention.

PARTS LIST 10 digital camera
11 lens
12 aperture/shutter controller
13 image sensor
16 analog signal processor
18 analog-to-digital converter
20 frame memory
22 digital signal processor
24 image display
25 liquid crystal display controller
26 data memory
28 memory card
30 memory card slot
32 memory card interface
34 host computer interface
36 camera microprocessor
38 timing generator
40 sensor driver
42 flash unit
44 photodiode
46 exposure driver
48 user inputs
50 status display
52 memory card fullness icon
54 adjustable inner portion
56 memory card slot
58 memory card
60 battery level indicator
62 flash mode indicator
64 liquid crystal display segment
68 memory card fullness icon
80 memory card fullness icon
82 card slot number
84 card slot number
86 card total memory size value
90 card total memory size value
94 adjustable inner portion
100 lower region
102 upper region
104 adjustable inner portion
106 lower region
middle region
upper region

What is claimed is:

1. A digital camera having a plurality of memory card fullness icons to visually indicate the amount of memory space that is available for storage in a plurality of corresponding removable memory cards insertable into the digital camera, comprising:

(a) means for capturing and digitizing image data;
(b) a display;
(c) a processor coupled to the display for constructing the plurality of memory card fullness icons on the display, each memory card fullness icon having an inner portion that can be adjusted to display in graphic format the relative amount of memory space that is available for storage in its corresponding removable memory card;
(d) means for receiving the plurality of removable memory cards;
(e) means for selecting one of the plurality of removable memory cards for storage;
(f) means for transferring the digitized image data into the selected removable memory card; and
(g) the processor including means responsive to the data transfer means for determining the relative amount of available memory space in the selected removable memory card and for modifying the adjustable inner portion of the corresponding memory card fullness icon on the display in accordance with the determined relative amount of available memory space on the selected removable memory card to visually indicate in graphic format the present relative amount of available memory space in the selected removable memory card.

2. The digital camera according to claim 1 wherein each memory card fullness icon includes a graphical representation of a removable memory card showing the relative amount of available memory space in its corresponding memory card.

3. The digital camera according to claim 1 further including means for selecting a second removable memory card and for transferring data from the first selected removable memory card to the second selected removable memory card.

4. The digital camera according to claim 1 wherein the display is a raster image display.

5. The digital camera according to claim 1 wherein the display is a segmented status display.

6. A digital camera having a plurality of removable memory cards and a display to indicate the amount of memory space that is available for storage in the plurality of removable memory cards, comprising:

(a) means for capturing and digitizing image data;
(b) means for receiving the plurality of removable memory cards;
(c) means for selecting a first removable memory card from the plurality of removable memory cards for storage;
(d) means for transferring the digitized image data into the first selected removable memory card;
(e) a processor coupled to the display for determining the amount of memory space that is available for storage in the first selected removable memory card and for controlling the display so as to visually indicate the present amount of available memory space in the first selected removable memory card; and
(f) means for selecting a second removable memory card and for transferring data from the first selected removable memory card to the second selected removable memory card.

7. The digital camera according to claim 6 wherein the processor further determines the amount of memory space that is available for storage in the second selected memory card, and wherein the display provides a graphical representation of two removable memory cards showing the determined amount of available memory space in each of the first and second selected removable memory cards.

8. The digital camera according to claim 7 wherein the graphical representation of each of the two removable memory cards includes a first portion representing the relative amount of memory which is currently storing images and a second portion representing the relative amount of unused memory space, and wherein the first portion has a different tone or color than the second portion.

9. The digital camera according to claim 6 wherein the display is a raster image display.

10. The digital camera according to claim 6 wherein the display is a segmented status display.

11. A digital camera having a plurality of removable memory cards and a display to indicate the amount of memory space that is available for storage in the plurality of removable memory cards, comprising:

(a) means for capturing and digitizing image data;

(b) means for receiving the plurality of removable memory cards;

(c) means for selecting one of the plurality of removable memory cards for storage;

(d) means for transferring the digitized image data into the selected removable memory card; and (e) a processor coupled to the display for determining the amount of memory space that is available for storage in the each of the plurality of removable memory cards and for controlling the display so as to visually indicate the present amount of available memory space in each of the removable memory cards.

12. The digital camera according to claim 11 wherein the display provides a graphical representation of each of the plurality of removable memory cards showing the determined amount of available memory space in each removable memory card.

13. The digital camera according to claim 12 wherein the graphical representation for each of the plurality of removable memory cards includes a first portion representing the relative amount of memory which is currently storing images and a second portion representing the relative amount of unused memory space, and wherein the first portion has a different tone or color than the second portion.

14. The digital camera according to claim 12 wherein the display is a raster image display.

15. The digital camera according to claim 12 wherein the display is a segmented status display.

* * * * *